307-425 XR 3,720,882

United States

Tang et al.

[11] 3,720,882

[45] March 13, 1973

[54] PARAMETRIC FREQUENCY CONVERSION

[75] Inventors: Henry Tang; William Happer, Jr., both of New York, N.Y.

[73] Assignee: Research Corporation, New York, N.Y.

[22] Filed: Aug. 3, 1970

[21] Appl. No.: 60,389

[52] U.S. Cl. ....................331/3, 307/88.3, 329/144, 331/94

[51] Int. Cl. ............................H03f 7/00, H03b 3/17

[58] Field of Search .....307/88.3; 331/3, 94; 329/144

[56] References Cited

UNITED STATES PATENTS

| | | | |
|---|---|---|---|
| 3,513,381 | 5/1970 | Happer | 331/3 |
| 3,493,894 | 2/1970 | Patel | 307/88.3 |

*Primary Examiner*—Roy Lake
*Assistant Examiner*—Darwin R. Hostetter
*Attorney*—Christopher C. Dunham, Robert S. Dunham, P. E. Henninger, Lester W. Clark, Gerald W. Griffin, Thomas F. Moran, Howard J. Churchill, R. Bradlee Boal, Robert Scobey and Henry T. Burke

[57] ABSTRACT

Parametric frequency conversion is effected in a sample of material, such as an alkali vapor, having an energy level system including first and second energy levels with a first transition frequency between them, and a third energy level with a second transition frequency between the third level and one of the first and second levels. The sample of material is disposed in a resonant structure resonating at a frequency substantially equal to the first transition frequency, so as to be within an oscillating electromagnetic field of frequency substantially equal to the first transition frequency, established and maintained by application of a signal to the resonant structure. With a population imbalance between the first and second levels established in the sample as by optical pumping, a carrier beam of energy at a frequency substantially equal to the second transition frequency is directed through the sample. The resonant structure is designed to provide a wavelength within the structure for the field frequency that satisfies a phase-matching condition such that sidebands of the carrier beam are produced by modulation of the index of refraction of the sample, these sidebands differing from the carrier frequency by integral multiples of the field frequency. By appropriate polarizing means, the generated sidebands can be detected, or alternatively, a polarized component of the carrier beam modulated in intensity at the field frequency can be detected. Devices providing this parametric frequency conversion may be arranged to operate as stable, self-oscillating frequency standards or for other purposes such as microwave photon detection.

15 Claims, 8 Drawing Figures

3720882
OR IN 331/3

INVENTORS
HENRY TANG
WILLIAM HAPPER, JR.
BY Christopher C. Dunham
ATTORNEY

INVENTORS
HENRY TANG
WILLIAM HAPPER, JR.
BY Christopher C. Dunham
ATTORNEY

INVENTORS
HENRY TANG
WILLIAM HAPPER, JR.
BY
Christopher C. Dunham
ATTORNEY

PARAMETRIC FREQUENCY CONVERSION

BACKGROUND OF THE INVENTION

This invention relates to apparatus for effecting parametric frequency conversion through utilization of quantum mechanical transitions in a medium to which energy of appropriate frequencies is applied. In an important specific aspect, the invention is directed to apparatus for effecting parametric frequency conversion of resonance radiation in an optically pumped atomic vapor. Particular applications of the invention include the provision of frequency standards and photon detectors or counters.

In recent years, a wide variety of devices employing quantum mechanical resonances in media such as atomic vapors have been developed for use as frequency standards and other purposes. Illustrative of such devices are passive atomic vapor frequency standards and maser oscillators.

In a typical passive atomic vapor frequency standard, a sample of a material such as an alkali vapor, having an energy level system characterized by a pair of hyperfine levels with a frequency separation in the microwave range, is placed in a microwave cavity that resonates at a frequency corresponding to the hyperfine transition frequency. Population imbalance between the hyperfine levels is established by pumping the vapor with a beam of optical energy at a frequency selected to raise atoms from one but not both hyperfine levels to an upper level from which the atoms can fall back to both hyperfine levels. When a microwave signal of frequency corresponding to the hyperfine transition frequency is applied to the cavity from a slave oscillator, the resonant oscillating magnetic field within the cavity induces transitions of atoms from the more populated hyperfine level to the less populated hyperfine level, thereby increasing the absorptivity of the vapor to the pumping beam. Changes in the applied microwave frequency alter the absorptivity of the vapor. Operation of the slave oscillator may be controlled to maintain a stable frequency (and hence to provide a frequency standard) by monitoring the pumping beam emerging from the vapor.

In a maser oscillator, a similar vapor may be used, contained in a microwave cavity resonating at the hyperfine transition frequency, and optically pumped to provide a difference in population between the hyperfine levels of the vapor sufficient for maser oscillation by stimulated emissive transitions of atoms of the vapor from the more highly populated to the less highly populated hyperfine level. A coherent output of microwave energy at the hyperfine transition frequency is thus produced.

The principles of operation of both passive atomic vapor frequency standards and maser oscillators are well known in the art. Each of these types of devices can be used as a relatively highly stable frequency standard as well as for other purposes. However, both types of devices are characterized by certain disadvantages such as in size and/or cost, and the passive frequency standards have the further disadvantage of requiring a separate slave oscillator, i.e., they are not self-oscillating.

Parametric frequency conversion of resonance radiation in media such as optically pumped atomic vapors has not heretofore been achieved at useful levels.

SUMMARY OF THE INVENTION

The present invention broadly contemplates the provision of a frequency-converting device including a sample of material having an energy level system including first and second levels with a transition frequency $\omega_{12}$ between the first and second levels and a third level with a transition frequency $\omega_{13}$ between the third level and one of the first and second levels; means for propagating electromagnetic energy of frequency $\nu$ substantially equal to frequency $\omega_{13}$ along an extended path through the sample; and means for establishing and maintaining a resonant oscillating electromagnetic field of frequency $\Omega$ substantially equal to frequency $\omega_{12}$ for inducing transitions between the first and second levels in the sample and thereby mdoulating the index of refraction of the sample. The field establishing and maintaining means includes a resonant structure (the sample being disposed within the field of the structure) resonating at a frequency substantially equal to frequency $\omega_{12}$ and having a wavelength $\Lambda$ within the structure for energy of that frequency. In accordance with the invention, the sample of material and the means for propagating energy of frequency $\nu$ therethrough are mutually disposed and adapted to provide a path for propagation of energy of frequency $\nu$ through the sample in the field having a length greater than $\Lambda$ ; and the resonant structure provides phase matching between the oscillating field and the energy of frequency $\nu$ propagating along that path.

Further in accordance with the invention, and as a particular feature thereof for attainment of the aforementioned phase-matching condition, the resonant structure is disposed to provide a wavelength $\Lambda$ within the structure such that $$|\underset{\sim}{K}| = 2\pi/\Lambda \qquad (1)$$

for $K$ defined by the relation $$\underset{\sim}{k}_o n(\nu) \pm \underset{\sim}{K} = \underset{\sim}{k}_{\pm} n(\omega_{\pm}) \qquad (2)$$

wherein $\underset{\sim}{k}_o$ = the free space wave vector of energy of frequency $\nu$;

$\underset{\sim}{k}_+$ = the free space wave vector of energy of frequency $\nu + \Omega$ ;

$\underset{\sim}{k}_-$ = the free space wave vector of energy of frequency $\nu - \Omega$ ;

$\underset{\sim}{K}$ = the wave vector characterizing the spatial modulation of the index of refraction of the sample;

$n(\nu)$ = the index of refraction of the sample for energy of frequency $\nu$ ;

$n(\omega_+)$ = the index of refraction of the sample for energy of frequency $\nu + \Omega$ ; and $n(\omega_-)$ = the index of refraction of the sample for energy of frequency $\nu - \Omega$.

Parametric frequency conversion in a system of this type requires a population difference between the first and second energy levels in the sample of material. If such difference or imbalance is not present, it may be established and maintained as by optical pumping. With the population imbalance established between the first and second levels, transitions between these two levels induced by the oscillating field within which the sample of material is disposed, produce modulated components of the index of refraction of the material for energy of frequencies close to the second transition frequency $\omega_{13}$. These modulated components of the index of refraction, oscillating at the first transition frequency $\omega_{12}$, parametrically couple a carrier wave of frequency close to $\omega_{13}$, propagating through the sample of material, with sideband waves differing in frequency from the carrier wave by amounts equal to the first transition frequency or multiples thereof. In other words, there is a conversion of the frequency of the field to the carrier sideband frequency. Theoretical considerations underlaying this phenomenon, in the case of an optically pumped alkali vapor (rubidium 87) are described in an article entitled "Microwave Light Modulation by an Optically Pumped $Rb^{87}$ Vapor" appearing in *Physical Review Letters*, Vol. 21, at p. 1035, dated 7 October 1968.

The present invention embraces the discovery that large efficiencies for the conversion of power from the carrier wave to the sideband frequencies are achieved by utilizing an extended path length (greater than $\Lambda$, and commonly at least several times $\Lambda$ or more) for propagation of the carrier wave through the sample of material, with phase-matching between the oscillating field and the carrier wave, as by utilizing a resonant structure that provides the phase-matching condition defined by equation (2) above, i.e., such that the wavelength within the structure for waves at the resonant frequency is as defined in equation (1) above. With use of such a resonant structure, and with an extended path length for propagation of the carrier wave through the sample of material, usefully high indexes of modulation may be achieved.

As herein used, the term "index of modulation" refers to a value equal to the square root of the conversion efficiency, which is the ratio of the energy of the sideband wave to the energy of the carrier wave. By way of illustration, conversion efficiencies of $10^{-3}$ or even very substantially greater are attainable with the present invention, whereas in devices heretofore known, conventionally having a carrier wave path length shorter than $\Lambda$ through a sample of material (e.g. an alkali vapor) the conversion efficiencies have been far lower, e.g. about $10^{-7}$.

It is found that when a circularly polarized carrier wave is passed through the sample of material, mixing between the carrier and sideband waves occurs, causing the circularly polarized carrier wave to be modulated in intensity at the first transition frequency $\omega_{12}$ of the material. Thus by selectively detecting a circularly polarized component of the carrier wave in the output beam from the sample of material, this intensity modulation may be detected and converted to a signal at the frequency $\omega_{12}$, which is fed back to the resonant structure to maintain the oscillating filed and thereby to provide self-oscillation of the system at the frequency $\omega_{12}$. This oscillator has satisfactorily high short-term frequency stability for use as a frequency standard. Indeed, the invention enables realization of significantly superior short-term frequency stability, as compared with existing types of frequency standards, owing to the large modulation (high power output) and high signal to noise ratio attainable in the devices of the invention.

Because of the nature of the modulated index of refraction, if the carrier beam is linearly polarized, the generated sidebands are linearly polarized at right angles to the polarized carrier beam. Only circularly polarized components of the carrier beam are intensity-modulated owing to the orthogonality (i.e., perpendicularity) of the carrier and sideband polarization. However, with use of a linearly polarized carrier beam, passage of the output beam from the sample of material through an appropriately oriented linearly polarizing element blocks the carrier wave while passing the sidebands to facilitate detection of the sidebands. Presence of the sidebands in the output beam indicates an input of photons of frequency $\Omega$ to the resonant structure and thus enables use of the device as a detector of such photons, e.g. in radio astronomy operations.

In specific embodiments, the invention contemplates use of an optically pumped atomic vapor, with a pair of ground state hyperfine levels having a microwave frequency separation, as the sample of material in which parametric frequency conversion is effected. A microwave resonant cavity, having a guide wavelength $\Lambda$ as defined in equation (1) above, is used as the resonant structure. The vapor is contained in a cell within the cavity, the cell and cavity being so arranged as to provide a long path length for propagation of the carrier wave through the vapor, and to permit optical pumping of the vapor throughout this length. Such arrangement affords usefully high levels of sideband generation and intensity modulation of the carrier wave, for employment of the device as a frequency standard or a microwave photon counter, or for other purposes.

Further features and advantages of the invention will be apparent from the detailed description hereinbelow set forth, together with the accompanying drawings.

DETAILED DESCRIPTION

For convenience of illustration, the invention will be described as embodied in a device for effecting parametric frequency conversion of resonance radiation in an optically pumped atomic vapor having a pair of ground state hyperfine levels with a hyperfine transition frequency $\omega_{12}$ in the microwave range, and an upper level with an atomic transition frequency $\omega_{13}$ (between the upper level and one of the hyperfine levels) in the optical range.

Figures 1, 2:
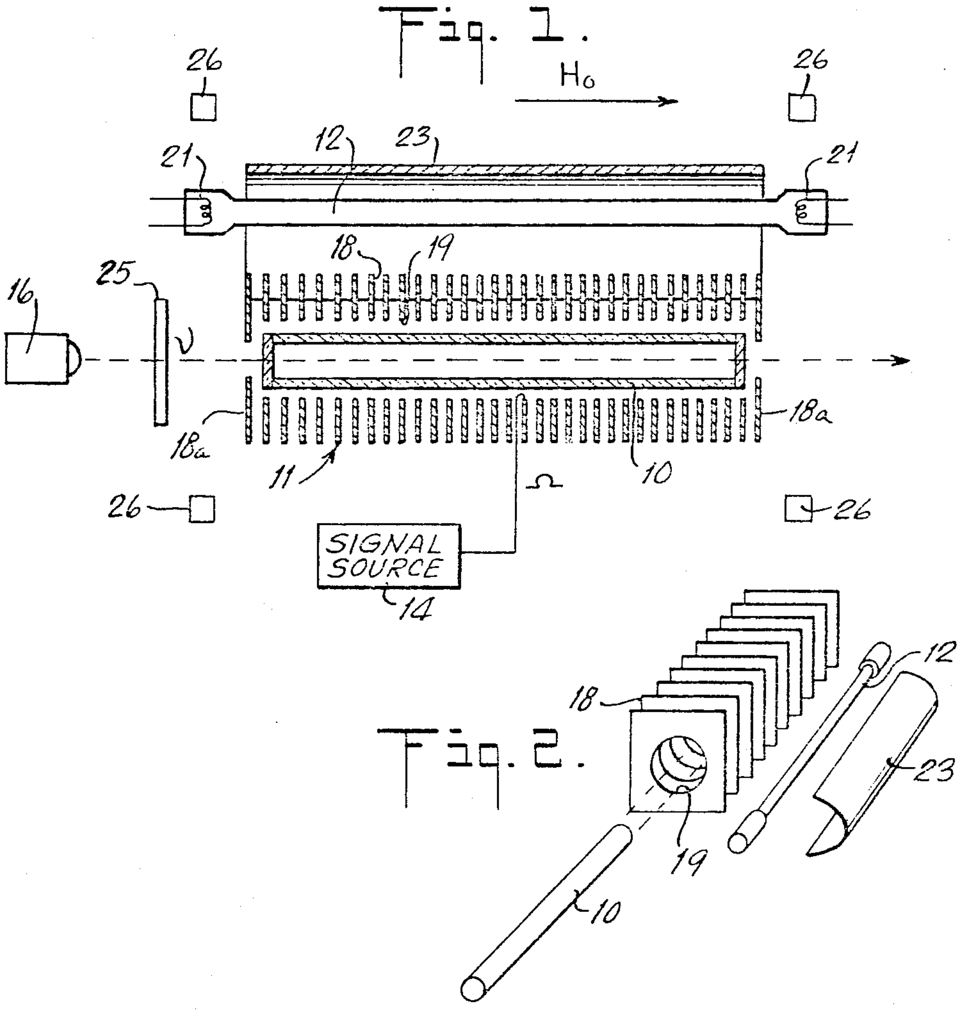
FIG. 1 is a simplified longitudinal sectional view of a frequency-converting device embodying the present invention in a particular form.
FIG. 2 is an exploded perspective view of the resonant cavity and associated portions of the structure of FIG. 1.

Referring first to FIGS. 1 and 2, the embodiment of the invention there shown includes a cell 10 containing the atomic vapor; a microwave cavity 11 within which the cell is placed, resonating at substantially the hyperfine transition frequency; a pumping light source 12 for optically pumping the atomic vapor to establish a population imbalance between the hyperfine levels; a signal source 14 for applying a microwave signal at substantially the hyperfine transition frequency to the cavity to establish and maintain therein a magnetic field oscillating at the resonant frequency of the cavity; and a carrier beam source 16 for directing longitudinally through the cell a beam of optical energy at a frequency close to the atomic transition frequency $\omega_{13}$. This arrangement utilizes atomic resonances for parametric frequency conversion; i.e., as the described carrier wave propagates through the vapor, the applied microwave signal at substantially the atomic resonant frequency $\omega_{12}$ causes generation of optical-frequency sidebands of the carrier wave and intensity modulation of circularly polarized components of the carrier wave at the microwave frequency, for selective utilization as desired, depending on the polarizing elements incorporated in the device.

Figure 3A:
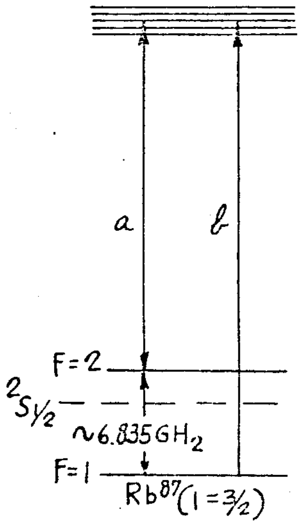
FIG. 3*a* is a diagram of the ground state level structure of rubidium 87 vapor.

By way of specific example, the vapor used in the device of FIGS. 1 and 2 may be rubidium 87. The ground state level structure of this isotope, shown in FIG. 3*a*, includes a pair of hyperfine energy levels $F = 2, M = 0$ and $F = 1, M = 0$, with a hyperfine transition frequency between the levels equal to about 6.835 GHz. This vapor may be optically pumped to establish an imbalance between the two hyperfine levels, with the light (at a wavelength of about 7800 A) emitted by rubidium 85 vapor in a d.c. discharge resonance lamp. That is to say, the light emitted by the rubidium 85 lamp pumps only the $F=2$ component of the rubidium 87 atoms to the aforementioned upper level, from which the atoms can fall back to either of the hyperfine levels, with resultant depletion in the population of the $F=2, M=0$ level and concomitant increase in population of the $F=1, M=0$ level.

With this population imbalance established, the field-independent hyperfine transition $F=1, M=0 \rightarrow F=2, M=0$, induced with a resonant oscillating magnetic field having a microwave frequency substantially equal to the hyperfine transition frequency of 6.835 GHz, produces modulated components $n_{\pm 1}$ of the index of refraction of the vapor for energy at frequencies close to the atomic transition frequency $\omega_{13}$. These modulated components of the index of refraction oscillate at the hyperfine transition frequency and are proportional to the hyperfine coherences of the vapor. If a beam of optical energy of frequency close to the atomic transition frequency $\omega_{13}$ is directed through the vapor as a carrier wave, the oscillating components of the index of refraction will parametrically couple the carrier wave propagating through the vapor with sideband waves. The frequency interval separating the carrier from the sidebands is equal to the frequency of the oscillating magnetic field or multiples thereof. Thus if the carrier frequency is designated $\nu$, and the field frequency is designated $\Omega$, the frequencies of the sidebands will be $\nu \pm \Omega$.

In the case of rubidium 87, the 6.835 GHz hyperfine frequency exceeds the spectral width ($\approx$ 1500 MHz) of a typical lamp line enabling, under proper conditions, achievement of well resolved sidebands, i.e., assuming attainment of a sufficiently high index of modulation. The carrier wave employed should have a frequency close to but not precisely coincident with the atomic transition frequency $\omega_{13}$ since light at that frequency is absorbed by the rubidium 87 vapor. The optical energy emission from rubidium 85 vapor contains frequency components appropriate for use as the carrier wave in operation of the device of the invention utilizing rubidium 87 vapor. Stated more generally, the carrier wave should be within the region of anomalous dispersion corresponding to the atomic transition frequency of the vapor used.

Referring now again more particularly to the device of FIGS. 1 and 2, the cell 10 comprises an elongated cylindrical fused quartz tube sealed at its ends with quartz windows to constitute an envelope for the rubidium 87 vapor, and coated with paraflint. This cell contains a small amount of rubidium 87 separated isotope and a buffer gas (which may be any suitable gas inert with respect to rubidium, one example of such gas being nitrogen, i.e., $N_2$). In accordance with presently preferred practice, the buffer gas pressure may be in the range between about 5 and about 13 Torr. The purpose of the buffer gas is to quench fluorescence and also to increase the relaxation time of the pumped rubidium atoms.

The cell 10 is disposed coaxially within the cavity 11, which is a circular cylindrical microwave cavity resonating at approximately 6.835 GHz in the $TE_{01n}$ mode. As shown, the cavity is formed of an array of spaced parallel flat metal plates 18 each having a circular hole 19 in its central portion, the holes of the plates being aligned to define the cylindrical cavity. The holes 19 are uniform in diameter, except that the holes in the opposite end plates 18*a* of the cavity are smaller than those in the remainder of the plates. The spacing between the plates is small enough so that the wave guide formed by the parallel plates is beyond cutoff for radial propagation of transverse electric waves in the cavity. To this end, the spacing between the plates is less than $\lambda/4$ for the wavelength $\lambda$ of the microwaves in the cavity.

Figure 4:
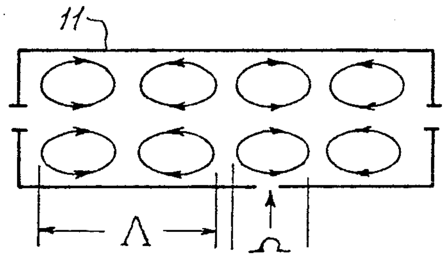
FIG. 4 is a diagrammatic representation of a resonant cavity illustrating features of the design of such cavity in accordance with the present invention.

In accordance with the invention, the cavity 11 is designed to provide, for the microwaves in the cavity, a guide wavelength $\Lambda$ satisfying the equation (1) above. The specific value of $\Lambda$ is a function of the cell temperature, pumping efficiency and the frequency of the carrier wave. The diagrammatic representation of the guide wavelength $\Lambda$ is shown in FIG. 4.

In the embodiment of FIGS. 1 and 2, the thickness and dimensions of the quartz cell 10 are selected so that the quartz tube dielectrically loads the cavity sufficiently to reduce the guide wavelength to the value defined by equation (1), for a given desired $\Lambda$ determined by the particular cell temperature, pumping efficiency and carrier frequency to be employed. In other words, the cell and cavity dimensions are mutually selected to provide the desired value of $\Lambda$, and hence to achieve in the device the phase-matching condition represented by equation (2) above.

The pumping light source 12 comprises a long discharge lamp, disposed outside but adjacent the cavity and extending in axially parallel relation to the cell 10. At its opposite ends, the discharge lamp 12 has electrodes comprising oxide-coated filaments 21 arranged for operation with either d.c. or a.c. current. The lamp, which may be filled with rubidium 85 separated isotope and krypton gas (e.g. at a pressure of about 1 to about 2 Torr.) is thermally insulated by a glass vacuum jacket (not shown) so that the equilibrium vapor pressure of rubidium is adequate for efficient lamp operation. Light from the lamp is focused on the cell 10 in the cavity by an elliptical reflector 23 so disposed that the axis of the cell 10 coincides with one focus of the reflector while the axis of the lamp 12 coincides with the other focus of the reflector. Light from the lamp 12 enters the cavity through the spaces between the plates 18 so as to pass into the cell 10 through the transparent quartz wall thereof for pumping the contained rubidium 87 vapor.

The design of the cell, cavity and pumping light source in the structure of FIGS. 1 and 2 provides a long path length for the carrier wave passing through the vapor, as desired to achieve a large index of modulation. This path length is at least greater than the guide wavelength $\Lambda$, and is commonly several times greater than $\Lambda$; in a typical example, with $\Lambda$ equal to about 8 cm., the axial dimension of the cell (i.e., the carrier wave path length through the cell) is about 45 cm. As hereinafter further explained, the carrier wave propagates along the long axis of the cell 10 through the vapor. The spaced plate construction of the cavity permits pumping light to enter the cell from the side so that the vapor can be uniformly pumped along the full length of the cavity.

The cavity 11 and the cell 10 are enclosed in a glass oven (not shown) which is electrically heated to maintain a fixed temperature for vaporization of rubidium 87 in the cell, it being understood that the vapor pressure of the rubidium is dependent on the temperature to which the cell is heated. A presently preferred value of temperature, maintained by the oven, is about 65°C.

The source 14 of the microwave signal applied to the cavity may be any suitable microwave signal source, such as a stabilized klystron oscillator or may comprise means for feeding back to the cavity the microwave signal that intensity-modulates a circularly polarized component of the carrier wave, as hereinafter further explained. The applied signal should be within about 1 Hz of the natural resonant frequency $\omega_{12}$ of the vapor.

The carrier beam source 16 may be a rubidium 85 lamp positioned to direct a beam of optical energy through the cell 10 (and hence through the contained rubidium 87 vapor) along the long axis of the cell. A filter and/or polarizer and/or optical collimating element 25 may be interposed between the carrier beam light source 16 and the cell 10. A conventional Helmholtz coil arrangement 26 may be disposed to surround the cavity and associated elements to eliminate external magnetic fields and to maintain a small static magnetic field $H_0$ along the axis of the cavity.

The operation of the device of FIGS. 1 and 2 may now be readily understood. With the cell 10 heated to a temperature maintained at about 65°C to provide the desired vapor pressure of rubidium 87 therein, and with the vapor continuously pumped by optical energy from the lamp 12, a microwave signal at about 6.835 GHz is applied to the cavity to establish and maintain a resonant oscillating magnetic field acting on the vapor in the cell, while a carrier beam is directed along the long axis of the cell from the carrier source 16. The oscillating field in the cavity modulates components of the index of refraction of the vapor for optical energy of frequencies close to that of the carrier beam, with the result that power is converted from the carrier beam to optical-frequency sideband waves differing in frequency from the carrier wave by amounts equal to the microwave frequency of the signal applied to the cavity, or multiples thereof. Circularly polarized components of the carrier beam are concomitantly modulated in intensity at that microwave frequency. If the carrier wave is not passed through polarizing elements prior to entering the cell, it may be considered as being constituted of independent right and left circularly polarized components of equal intensity. These beams will be modulated with equal intensity but 180° out of phase. Hence, no modulation of the unpolarized carrier beam can be detected; but if the beam is passed through a circular analyzer (after emerging from the cell 10) to select one sense of circular polarization, the selected circularly polarized component of the carrier wave will be found to be intensity modulated as described.

The long length of optically pumped rubidium 87 vapor traversed by the carrier beam in the device of FIGS. 1 and 2, together with the cavity design which provides the desired phase-matching between the carrier wave and the oscillating susceptibility of the vapor, affords a high index of modulation (e.g. an index of modulation, as defined above, of the order of about 3 percent or even substantially higher), enabling use of the parametric frequency conversion effect for various purposes. That is to say, the cavity design provides a phase-matching condition such that the difference between the propagation constants of the carrier and strong sideband light waves in the rubidium 87 vapor is equal to the propagation constant of the microwaves in the cavity, this being the condition for most efficient coupling of the carrier wave to the strong sideband light wave and hence for efficient generation of the sideband waves through conversion of power from the carrier to the sidebands.

In a specific example of the device of the type shown in FIGS. 1 and 2, for operation with rubidium 87 vapor at the vapor pressure corresponding to an oven temperature of 65°C, the cell 10 has an axial length of about 45 cm, and the holes 19 in the plates 18 have a diameter of about 6.5 cm, except for the holes in the opposite end plates 18*a* of the cavity, which have a diameter of about 3 cm and are disposed in coaxial relation to the holes in the other plates. The spacing between plates is about 1 cm. This cavity had an unloaded Q of about $10^4$ for the $TE_{01n}$ modes. The guide wavelength was about 8 cm. In this apparatus, the observed conversion efficiency was somewhat greater than $10^{-3}$, which corresponds to an index of modulation of about 3 percent or greater, whereas in a typical, illustrative device of a type heretofore known, with a carrier wave path length equal to less than one guide wavelength through a sample of rubidium 87 vapor in a microwave cavity, the conversion efficiency was on the order of $10^{-7}$. With further increase in carrier wave path length through the vapor, further enhancement of the index of modulation can be achieved.

By way of further example, in a device of the type described utilizing rubidium 87 at a vapor pressure corresponding to the temperature of 65°C, for which the desired guide wavelength was about 6 cm for optimum phase-matching to the upper sideband, and with a quartz tube for the cell 10 having a length of about 45 cm, the desired guide wavelength is achieved with the following cavity and quartz tube dimensions: internal radius of quartz tube, 2.28 cm; outer radius of quartz tube, 2.53 cm; and radius of cavity (i.e., radius of holes 19) about 3 cm.

Figure 5:
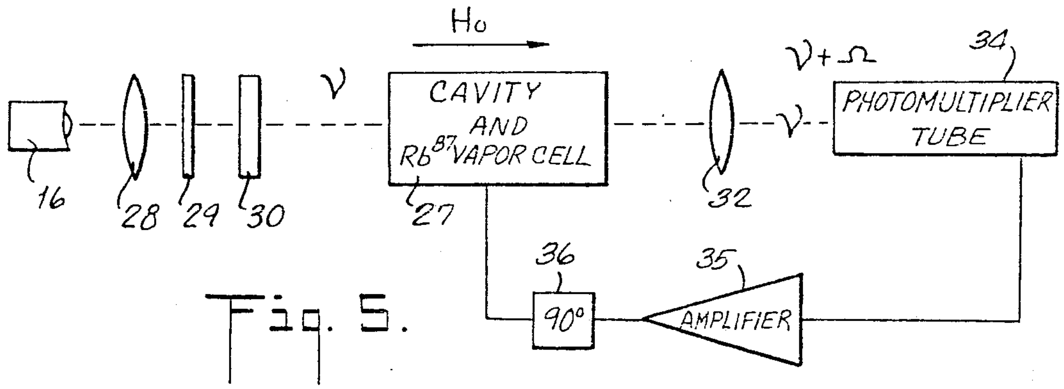
FIG. 5 is a diagrammatic view of an oscillator incorporating an embodiment of the invention and arranged for operation as a frequency standard.

An oscillator incorporating the device of the invention, and suitable for use as a frequency standard, is illustrated schematically in FIG. 5. In the oscillator of FIG. 5, block 27 represents the rubidium 87 vapor cell 10, cavity 11 and pumping source 12 shown in FIG. 1. A beam of optical energy of frequency $\nu$ is directed from a rubidium 85 vapor lamp 16 through a collimating lens 28, circular polarizer 29, and filter 30 and thence through the cell 10 to provide a circularly polarized carrier wave of frequency $\nu$ propagating along the long axis of the cell through the rubidium 87 vapor. In the cell, this circularly polarized carrier beam is intensity modulated at the frequency $\Omega$ of the microwave signal applied to the cavity, i.e., substantially at the microwave hyperfine transition frequency of rubidium 87. After emerging from the cell and passing through a further lens 32, the modulated carrier beam is detected by a high speed photodetector such as a cross-field photomultiplier tube 34 which provides an output signal at the microwave modulating frequency $\Omega$. The microwave output from the photomultiplier is first amplified if necessary by amplifier 35 and is then phase-shifted by 90° in a suitable element 36. The signal is then fed back to the microwave cavity to maintain therein the oscillating field which excites the index of refraction of the vapor. When the loop gain of the system is adjusted to be unity, the system will self-oscillate at the microwave hyperfine transition frequency of the atoms in the vapor. The width of the hyperfine resonance for rubidium is on the order of 50 Hz. The factors which affect the stability of such an oscillator are light shifts which depend on the intensity and the spectral profile of the pumping light and the buffer gas shift which depends on the temperature of the cell 10. The short-term stability attainable with this oscillator is significantly superior to that of a passive rubidium 87 vapor frequency standard, and in addition, the oscillator of FIG. 5 is simpler in construction and operation than the known passive standard as it does not require a separate crystal oscillator.

Figure 6:
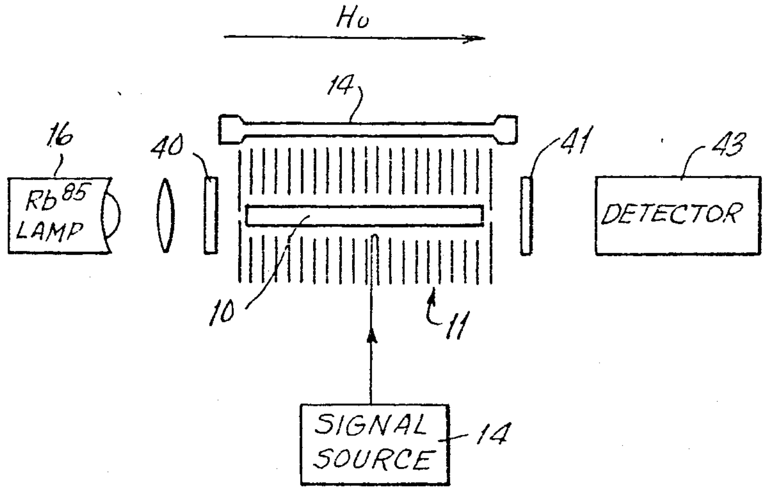
FIG. 6 is a schematic view of another form of apparatus incorporating an embodiment of the invention and arranged for detection of optical sidebands generated therein.

FIG. 6 illustrates schematically another form of apparatus incorporating the device of the invention, again utilizing the cell 10 containing rubidium 87 vapor, and arranged for detection of the optical sidebands generated in the cell. The arrangement of cell 10, cavity 11, pumping source 12 and carrier beam source 16 in FIG. 6 is as described above with reference to FIGS. 1 and 2. Ahead of the cell 10, the carrier beam from lamp 16 is passed through a linear polarizer 40, and beyond the cell 10 the emerging output beam from the cell is passed through a second linear polarizer 41 oriented orthogonally with respect to polarizer 40, so that the linearly polarized light passed by polarizer 40 is blocked by polarizer 41. However, since optical sidebands produced in the cell 10 are polarized orthogonally with respect to the linearly polarized carrier wave, the polarizer 41 passes the sideband waves, which may be detected beyond the polarizer 41 by suitable detecting means represented by block 43. This arrangement enables utilization of the device of the invention for applications in which detection of the generated sidebands is desired. For example, the device of FIG. 6 may be used as a microwave photon detector or counter in applications such as radio astronomy, the power of the generated sidebands being proportional to, and hence providing a measure of, the microwave power input to the cavity.

Since the device of FIG. 6 is a 4-frequency parametric up converter, the four frequencies being the microwave frequency, the optical carrier frequency, and the two sideband frequencies, amplification occurs in converting from the microwave frequency to the optical sideband frequency. This power gain which occurs when microwave photons are converted to optical photons on a one-to-one basis is theoretically equal to the ratio of the optical frequency to the microwave frequency, that ratio being on the order of $10^6$. Hence the parametric up converter may find use as a sensitive microwave photon detector. Advantages of the device for such use are its extremely low noise properties, which result from the fact that the carrier light can be discriminated from the sideband light to a high degree with polarizers and atomic vapor filters; also, the device has a very narrow band width and can be made tunable over a range of several MHz by operating on a magnetic field dependent transition.

Figure 3B:
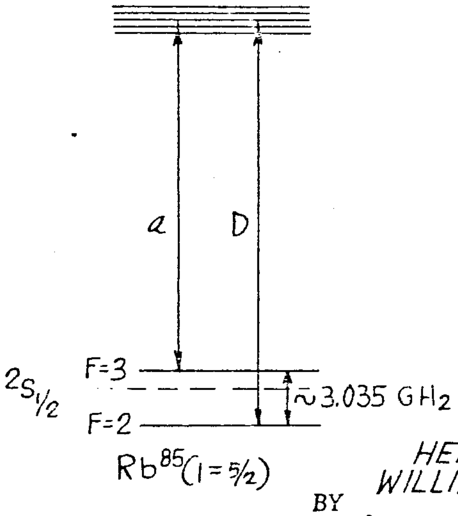
FIG. 3*b* is a diagram of the ground state level structure of rubidium 85 vapor.
Figure 7:
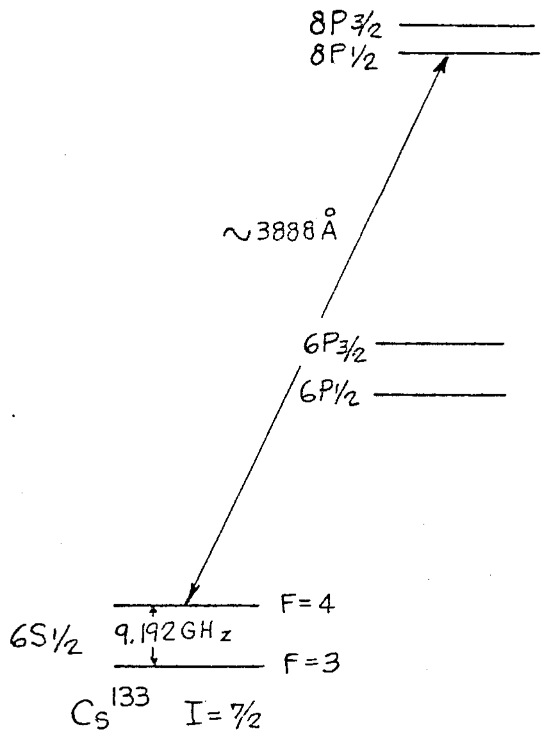
FIG. 7 is an energy level diagram of cesium 133 vapor.

While rubidium 87 has been mentioned as illustrative of the materials that can be employed in the device of the invention, it will be appreciated that a wide variety of other materials may be used. For example, other alkali vapors such as rubidium 85 and cesium 133 may be used. In the case of rubidium 85 vapor (having the ground state level structure shown in FIG. 3*b*), rubidium 87 resonance light may be used for pumping. In the case of cesium 133 vapor (having the energy level system shown in FIG. 7), the 3888 A resonance line of helium may be used for pumping.

It is to be understood that the invention is not limited to the features and embodiments hereinabove specifically set forth, but may be carried out in other ways without departure from its spirit.

We claim:

1. A frequency-converting device including a. a sample of material having an energy level system including first and second levels with a transition frequency $\omega_{12}$ between said first and second levels and a third level with a transition frequency $\omega_{13}$ between said third level and one of said first and second levels;

b. means for propagating electromagnetic energy of frequency $\nu$ substantially equal to frequency $\omega_{13}$ along an extended path through said sample; and c. means for establishing and maintaining a resonant oscillating electromagnetic field of frequency $\Omega$ substantially equal to frequency $\omega_{12}$ for inducing transitions between said first and second levels in said sample and thereby modulating the index of refraction of said sample, said field-establishing and maintaining means including a resonant structure, said sample being disposed within the field of said structure, said structure resonating at a frequency substantially equal to frequency $\omega_{12}$ and providing a wavelength $\Lambda$ within the structure for energy of said last-mentioned frequency;

wherein the improvement comprises:

d. said resonant structure including means for providing phase-matching between said oscillating field and energy of frequency $\nu$ propagating along said path; and e. said sample of material and said means for propagating energy of frequency $\nu$ being mutually disposed and adapted such that said path through said sample in said field has a length greater than $\Lambda$..

2. A device as defined in claim 1, including means for establishing and maintaining a population imbalance between said first and second levels in said sample of material.

3. A device as defined in claim 1, wherein said frequency $\nu$ is sufficiently close to said frequency $\omega_{13}$ to be modulated by resonance of said material at said frequency $\omega_{12}$ and sufficiently different from said frequency $\omega_{13}$ so that the energy of frequency $\nu$ is not substantially absorbed by said material.

4. A device as defined in claim 3, including means for selectively detecting a circularly polarized component of said energy of frequency $\nu$ after passage thereof through said sample of material to detect modulation in intensity of said component.

5. A device as defined in claim 3, including first and second linear polarizing elements respectively disposed on opposite sides of said sample of material in the propagation path of said energy of frequency $\nu$, said polarizing elements being disposed orthogonally with respect to each other.

6. A device as defined in claim 1, wherein said material is an atomic vapor, said first and second levels are hyperfine levels, said transition frequency $\omega_{12}$ is a microwave frequency, and said transition frequency $\omega_{13}$ is an optical frequency; wherein absorption of energy of said frequency $\omega_{13}$ by said vapor effects population imbalance between said hyperfine levels; and including means for pumping said vapor with optical energy of said frequency $\omega_{13}$ to produce a population imbalance between said hyperfine levels as aforesaid.

7. A device as defined in claim 6, wherein said resonant structure is a microwave cavity resonating at a frequency substantially equal to $\omega_{12}$, and further including means for applying a microwave signal of said frequency $\Omega$ to said cavity.

8. A device as defined in claim 7, wherein said atomic vapor is contained within an elongated envelope disposed within said cavity; said means for propagating energy of frequency $\nu$ is disposed and adapted to direct a beam of said energy along a path extending longitudinally through said envelope; said cavity comprises a plurality of plates of conductive material having aligned central openings and disposed in spaced array along said last-mentioned path with the major surfaces of said plates extending transversely of said path; and said pumping means comprises means disposed externally of said cavity for directing pumping energy into said envelope, transversely of said path, through the spaces between said plates over at least a major portion of the length of said envelope.

9. A device as defined in claim 8, wherein said envelope comprises a body of dielectric material dimensioned to dielectrically load said cavity for reducing the guide wavelength thereof to the value $\Lambda$.

10. A device as defined in claim 7, wherein said vapor is an alkali vapor.

11. A device as defined in claim 10, wherein said vapor is rubidium 87 vapor.

12. A device as defined in claim 11, wherein said pumping means comprises a first rubidium 85 lamp, and said means for propagating energy of frequency $\nu$ comprises a second rubidium 85 lamp.

13. A device as defined in claim 12, including means for selectively detecting a circularly polarized component of said beam after passage thereof through said vapor, said component being modulated in intensity at a microwave frequency substantially equal to $\omega_{12}$, and wherein said means for applying a microwave signal to said cavity comprises means for deriving from said circularly polarized component of said beam a microwave signal at the frequency of modulation of said component and feeding said last-mentioned signal back to said cavity.

14. A device as defined in claim 10, wherein said vapor is rubidium 85 vapor.

15. A device as defined in claim 10, wherein said vapor is cesium 133 vapor.

* * * * *